United States Patent
Butzmann et al.

(10) Patent No.: US 9,045,054 B2
(45) Date of Patent: Jun. 2, 2015

(54) BATTERY SYSTEM HAVING AN INTERMEDIATE CIRCUIT VOLTAGE WHICH CAN BE SET IN A VARIABLE FASHION

(75) Inventors: Stefan Butzmann, Beilstein (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 13/825,177

(22) PCT Filed: Sep. 7, 2011

(86) PCT No.: PCT/EP2011/065447
§ 371 (c)(1),
(2), (4) Date: Jun. 21, 2013

(87) PCT Pub. No.: WO2012/038252
PCT Pub. Date: Mar. 29, 2012

(65) Prior Publication Data
US 2014/0176024 A1    Jun. 26, 2014

(30) Foreign Application Priority Data

Sep. 20, 2010 (DE) .......................... 10 2010 041 014

(51) Int. Cl.
| | |
|---|---|
| *H02P 4/00* | (2006.01) |
| *B60L 11/18* | (2006.01) |
| *H02J 7/00* | (2006.01) |
| *H01M 10/0525* | (2010.01) |
| *H01M 16/00* | (2006.01) |

(52) U.S. Cl.
CPC ......... *B60L 11/1879* (2013.01); *B60L 11/1803* (2013.01); *B60L 11/1866* (2013.01);
(Continued)

(58) Field of Classification Search
CPC ........................................................ H02P 4/00
USPC ............................................ 318/139, 34, 558
See application file for complete search history.

(56) References Cited

U.S. PATENT DOCUMENTS

| | | | |
|---|---|---|---|
| 5,296,799 A | * | 3/1994 | Davis .............................. 322/35 |
| 5,670,861 A | | 9/1997 | Nor |

(Continued)

FOREIGN PATENT DOCUMENTS

| | | |
|---|---|---|
| CN | 101194406 A | 6/2008 |
| EP | 2 061 116 A1 | 5/2009 |

(Continued)

OTHER PUBLICATIONS

International Search Report corresponding to PCT Application No. PCT/EP2011/065447, mailed Oct. 31, 2011 (German and English language document) (7 pages).
(Continued)

*Primary Examiner* — David S Luo
(74) *Attorney, Agent, or Firm* — Maginot, Moore & Beck LLP

(57) ABSTRACT

A battery system includes a battery, a DC voltage intermediate circuit connected to the battery, an inverter connected to the DC voltage intermediate circuit and an electric motor connected to the inverter. The DC voltage intermediate circuit includes a capacitor, and the battery includes a battery module line having a plurality of battery modules which are connected in series, and a control unit. Each battery module includes a coupling unit and at least one battery cell which is connected between a first input and a second input of the coupling unit. The coupling unit is configured to connect the at least one battery cell between a first terminal of the battery module and a second terminal of the battery module in response to a first control signal, and to connect the first terminal to the second terminal in response to a second control signal.

9 Claims, 5 Drawing Sheets

(52) U.S. Cl.
CPC ...... *B60L2240/545* (2013.01); *B60L 2240/547* (2013.01); *B60L 2240/549* (2013.01); *H01M 10/0525* (2013.01); *H01M 16/00* (2013.01); *H02J 7/0013* (2013.01); *Y02T 10/7005* (2013.01); *Y02T 10/7011* (2013.01); *Y02T 10/7055* (2013.01); *Y02T 10/7061* (2013.01); *B60L 11/1857* (2013.01); *H02P 4/00* (2013.01)

(56) References Cited

U.S. PATENT DOCUMENTS

| | | | | |
|---|---|---|---|---|
| 5,905,360 | A | * | 5/1999 | Ukita .......................... 320/118 |
| 7,782,015 | B1 | * | 8/2010 | Aaron ......................... 320/123 |

| | | | |
|---|---|---|---|
| 2004/0135545 | A1 | 7/2004 | Fowler et al. |
| 2008/0197810 | A1 | 8/2008 | Ishikawa et al. |

FOREIGN PATENT DOCUMENTS

| | | |
|---|---|---|
| JP | 8-289479 A | 11/1996 |
| JP | 2001-292532 A | 10/2001 |
| JP | 2008-67500 A | 3/2008 |
| WO | 2006/079202 A1 | 8/2006 |

OTHER PUBLICATIONS

Tolbert, Leon M., et al., Multilevel Converters for Large Electric Drives, IEEE Transactions on Industry Applications, Jan./Feb. 1999, vol. 35, No. 1, pp. 36-44, XP011022532.

\* cited by examiner

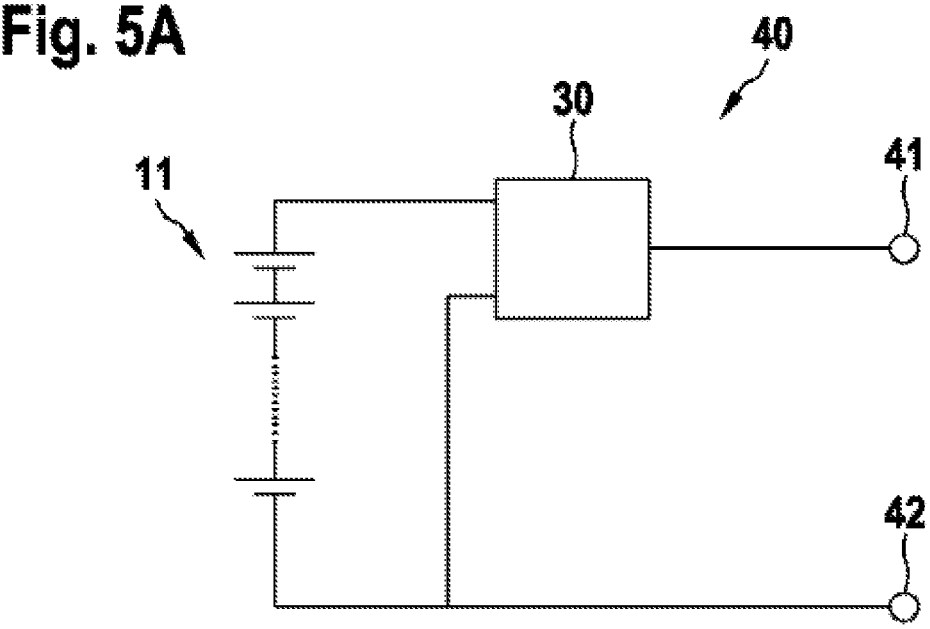
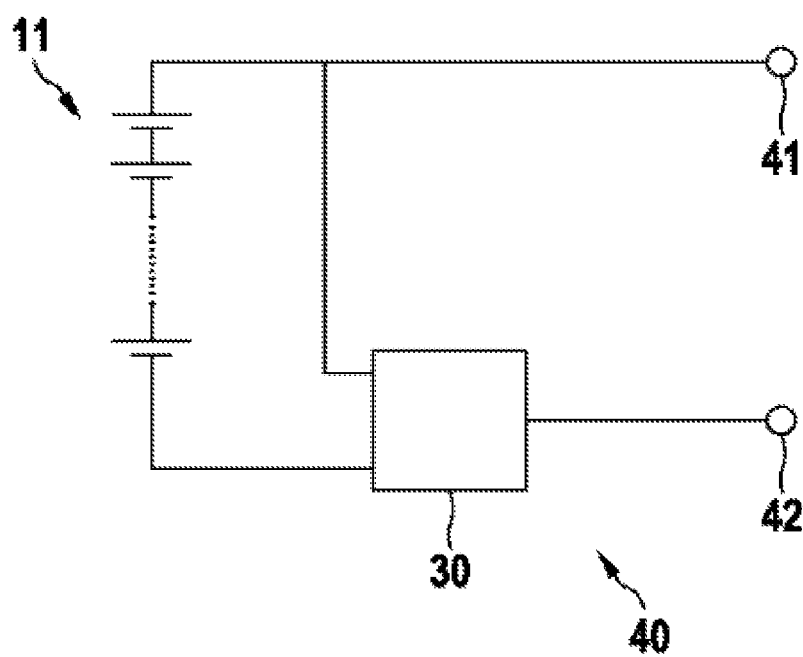

BATTERY SYSTEM HAVING AN INTERMEDIATE CIRCUIT VOLTAGE WHICH CAN BE SET IN A VARIABLE FASHION

This application is a 35 U.S.C. §371 National Stage Application of PCT/EP2011/065447, filed on Sep. 7, 2011, which claims the benefit of priority to Serial No. DE 10 2010 041 014.4, filed on Sep. 20, 2010 in Germany, the disclosures of which are incorporated herein by reference in their entirety.

The present disclosure relates to a battery system having an intermediate circuit voltage that can be set in a variable manner and a method for operating a battery system of this type.

BACKGROUND

It has become apparent that in future both in the case of stationary applications and also in the case of vehicles such as hybrid vehicles and electric vehicles battery systems are being used ever more frequently. In order to be able to meet the particular voltage requirements for a respective application and to be able to provide the power that can be made available, a high number of battery cells are connected in series. Since it is necessary for current that is provided by a battery of this type to flow through all battery cells and a battery cell can only carry a limited amount of current, battery cells are in addition often connected in parallel in order to increase the maximum current. This can be achieved either by providing a plurality of battery packs within a battery cell housing or by connecting battery cells externally.

FIG. 1 illustrates the principal schematic diagram of a conventional electric drive system, such as is used in electric vehicles and hybrid vehicles or also in stationary applications such as when adjusting rotor blades of wind power plants. A battery 10 is connected to a DC voltage intermediate circuit and said DC voltage intermediate circuit is buffered by a capacitor 11. A pulse-controlled inverter 12 is connected to the DC voltage intermediate circuit and sinusoidal voltages that are phase-offset with respect to each other for operating an electric drive motor 13 are supplied by said pulse-controlled inverter 12 to three outputs by way of in each case two switchable semi-conductor gates and two diodes. The capacity of the capacitor 11 must be sufficiently large in order to stabilize the voltage in the DC voltage intermediate circuit for a period of time in which one of the switchable semi-conductor gates is switched to conduct. In a practical application, such as an electric vehicle, a high capacity in the mF range is achieved.

FIG. 2 illustrates the battery 10 of FIG. 1 in a detailed block diagram. A plurality of battery cells is connected in series and optionally in addition in parallel in order to achieve a battery capacity and a high output voltage required for a respective application. A charging and disconnecting device 16 is connected between the positive pole of the battery cells and a positive battery terminal 14. Optionally, a disconnecting device 17 can in addition be connected between the negative pole of the battery cells and a negative battery terminal 15. The disconnecting and charging device 16 and the disconnecting device 17 comprise in each case a switch 18 or 19 respectively, which switches are provided for disconnecting the battery cells from the battery terminals in order to disconnect the battery terminals from the voltage supply. Otherwise, as a result of the high DC voltage of the battery cells that are connected in series, there is a considerable potential risk for maintenance personnel or the like. A charging switch 20 having a charging resistor 21 that is connected in series to the charging switch 20 is in addition provided in the charging and disconnecting device 16. The charging resistor 21 limits a charging current for the capacitor if the battery is connected to the DC voltage intermediate circuit. For this purpose, the switch 18 is initially left open and only the charging switch 20 is closed. If the voltage at the positive battery terminal 14 achieves the voltage of the battery cells, the switch 19 can be closed and if necessary the charging switch 20 can be opened. The switches 18, 19 and the charging switch 20 significantly increase the costs for a battery 10, since high demands are placed on their reliability and on the currents that they are to carry.

SUMMARY

It is therefore proposed in accordance with the disclosure to provide a battery system having a battery, a DC voltage intermediate circuit that is connected to the battery, an AC converter that is connected to the DC voltage intermediate circuit, and an electric motor that is connected to the AC converter. The DC voltage intermediate circuit comprises a capacitor and the battery comprises a battery module string having a plurality of battery modules that are connected in series, and a control unit. Each battery module comprises a coupling unit and at least one battery cell that is connected between a first input and a second input of the coupling unit. The coupling unit is embodied to switch the at least one battery cell between a first terminal of the battery module and a second terminal of the battery module in response to a first control signal and in response to a second control signal to connect the first terminal to the second terminal. The control unit is embodied to transmit the first control signal to a variable number of battery modules of the battery module string and to transmit the second control signal to the remaining battery modules of the battery module string and thus to set a voltage of the DC voltage intermediate circuit in a variable manner.

The disclosure has the advantage that a voltage of the DC voltage intermediate circuit can be set in a variable manner and thus can be adapted to suit different operating conditions. It is possible in this manner to set the torque and accordingly the rotational speed of the electric motor to a greater extent independently from the respective output of the motor. The voltage of the DC voltage intermediate circuit can thus be set in an optimum manner for the respective current operating state of the electric motor, e.g. in a drive system of a motor vehicle. In addition, the reliability of the battery system is increased because defective battery modules, i.e. battery modules whose at least one battery cell is defective, can be deactivated. The term 'reliability' is understood to mean the ability of a system to function correctly for a predetermined period of time. If a battery module is deactivated, the maximum possible voltage of the DC voltage intermediate circuit is no longer available to the battery system. However, this does not lead to a failure of the entire system in a drive system but rather only to an operation with a reduced output.

In this case, it is particularly preferred that the battery is directly connected to the DC voltage intermediate circuit, in other words, no charging and disconnecting device 16 and disconnecting device 17, as illustrated in FIG. 2, are provided. These charging and disconnecting devices 16, 17 must meet high demands and must also render it possible for the battery to be disconnected safely even under a loading. However, since the coupling units already provide such a disconnecting function, it is possible to disconnect the battery contacts from the voltage supply, while the coupling units are controlled accordingly. It is assumed for this reason that there is no longer a need for disconnecting devices of this type, since the desired safety of the entire arrangement is also achieved without galvanic separation. Even a defective series connection of a plurality of semi-conductor switches in the coupling units, for example as a result of a failure of pn-junctions, cannot lead to inadmissibly high voltages being present at the connections of the battery.

In order to increase the operating safety, it is possible in one variant of the battery system for at least one of the coupling units of the battery module string to be embodied to disconnect the first terminal of the respective battery module from the second terminal in response to a third control signal from each other and from the at least one battery cell. In so doing, the battery module is connected in a high-impedance manner to the coupling unit, in other words, the two poles of the battery module are not connected in an electrically conductive manner and consequently are disconnected. In combination with the preceding embodiment, the safety aspect can be further increased because up to twice the number of switches can be connected in an impeding manner. This feature of the embodiment of the disclosure can, however, also be achieved irrespective of safety aspects.

The coupling unit can comprise a first output and can be embodied to connect either the first input or the second input to the output in response to the first control signal. In so doing, the output is connected to one of the terminals of the battery module and one of the first input or second input is connected to the other of the terminals of the battery module. A coupling unit of this type can be achieved using only two switches, preferably semi-conductor switches such as MOSFETs or IGBTs.

Alternatively, the coupling unit can comprise a first output and a second output and can be embodied to connect the first input to the first output and the second input to the second output in response to the first control signal. In so doing, the coupling unit is embodied in addition to disconnect the first input from the first output and the second input from the second output and to connect the first output to the second output in response to the second control signal. This embodiment requires a comparatively higher expenditure in relation to the connections (usually three switches), it does however disconnect the battery cells of the battery module at its two poles, so that in the event of a threatened total discharge or damage to a battery module its battery cells are disconnected from the voltage supply and thus said battery cells can be replaced without risk during continued operation of the entire arrangement.

The control unit can comprise a battery cell diagnostic unit that is connected or can be connected to the battery cells of the battery modules. The battery cell diagnostic unit is in so doing embodied to determine a state of aging of the battery cells. The control unit is then embodied to transmit the second control signal to the battery modules for whose battery cells the battery cell diagnostic unit has determined the state of aging to be greater than a predetermined maximum state of aging. The battery cell diagnostic unit can use any known diagnostic methods in order to determine the state of aging of a battery cell or of a group of battery cells. Thus, characteristic parameters of the battery cells, such as cell voltage, cell temperature, battery current, dynamic change in the cell voltage when there is a change in loading and the like, can be sensed and evaluated. If the state of aging that is established for a battery cell or for a plurality of battery cells of a battery module exceeds the predetermined maximum state of aging, the battery module is switched to an inactive state, i.e. its outputs are bridged. This can be used advantageously within the scope of cell-balancing or else to protect the battery cells from totally discharging.

It is particularly preferred that the battery cells are lithium-ion battery cells. Lithium-ion battery cells comprise the advantages of a high cell voltage and high energy content in a given volume.

A second aspect of the disclosure relates to a motor vehicle having a battery system in accordance with the first aspect of the disclosure, wherein the electric motor is embodied to drive the motor vehicle.

A third aspect of the disclosure provides a method for operating a battery system having a battery, a DC voltage intermediate circuit that is connected to the battery, an AC converter that is connected to the DC voltage intermediate circuit, and an electric motor that is connected to the AC converter. The battery comprises in this case a plurality of battery cells. The method comprises at least the following steps:

Disconnect a number of battery cells;
Bridge the number of battery cells; and
Connect in series the remaining battery cells, so that a voltage of the DC voltage intermediate circuit can be set in a variable manner.

The method can comprise additional steps of determining a state of aging of the battery cells and comparing the various states of aging of the battery cells with a predetermined maximum state of aging, wherein the number of battery cells comprises precisely those battery cells whose state of aging is greater than the maximum state of aging.

BRIEF DESCRIPTION OF THE DRAWINGS

Exemplary embodiments of the disclosure are explained in detail with reference to the drawings and the description hereinunder, wherein like reference numerals describe like components or components that function in a like manner. In the drawings:

FIGS. 5A and 5B show two embodiments of a battery module having the first embodiment of the coupling unit.

DETAILED DESCRIPTION

Figure 3:
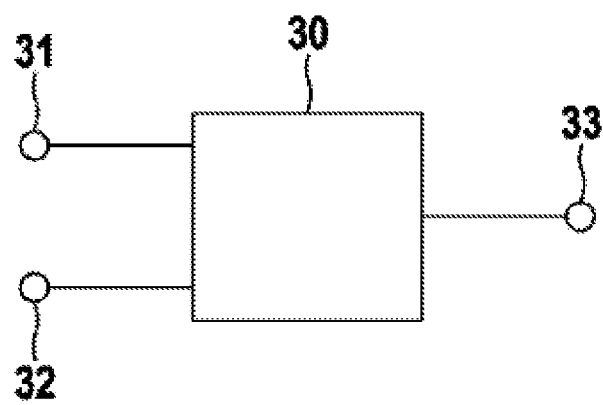
FIG. 3 shows a first embodiment of a coupling unit for use in the battery in accordance with the disclosure.

FIG. 3 illustrates a first embodiment of a coupling unit 30 for use in the battery system in accordance with the disclosure. The coupling unit 30 comprises two inputs 31 and 32 and also an output 33 and said coupling unit is embodied to connect one of the inputs 31 or 32 to the output 33 and to disconnect the other input.

Figure 4:
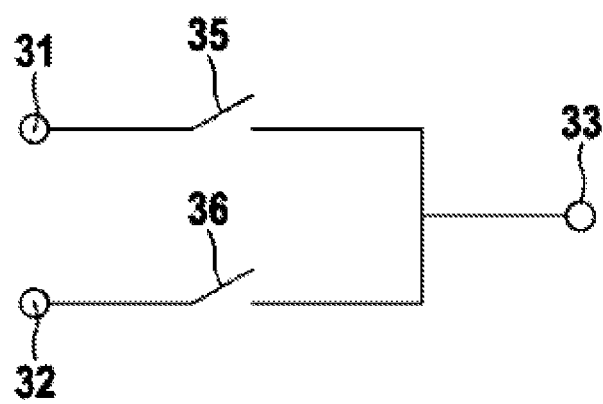
FIG. 4 shows a possible implementation of the first embodiment of the coupling unit with regard to the switching technology.

FIG. 4 illustrates a possible implementation of the first embodiment of the coupling unit 30 with regard to the switching technology, wherein a first and a second switch 35 and 36 respectively are provided. Each of the switches 35, 36 is connected between one of the inputs and 32 respectively and the output 33. This embodiment provides the advantage that it is also possible to disconnect the two inputs 31, 32 from the output 33, so that the output 33 is a high impedance output, which can be useful, for example, in the case of making a repair or carrying out maintenance. In addition, the switches 35, 36 can be embodied simply as semi-conductor switches such as MOSFETs or IGBTs. Semi-conductor switches have the advantage of being favorably priced and providing a high switching rate, so that the coupling unit 30 can react within a comparatively short time period to a control signal and accordingly to a change of control signal.

FIGS. 5A and 5B illustrate two embodiments of a battery module 40 having the first embodiment of the coupling unit 30. A plurality of battery cells 11 is connected in series between the inputs of the coupling unit 30. However, the disclosure is not limited to battery cells 11 being connected in series in this manner, it can also provide only one individual battery cell 11 or else a parallel connection or a combination of a series and parallel connection of battery cells 11. In the example illustrated in FIG. 5A, the output of the coupling unit 30 is connected to a first terminal 41 and the negative pole of the battery cells 11 is connected to a second terminal 42. However, an almost mirror-inverted arrangement as illustrated in FIG. 5B is possible, wherein the positive pole of the battery cells 11 is connected to the first terminal 41 and the output of the coupling unit 30 is connected to the second terminal 42.

Figure 6:
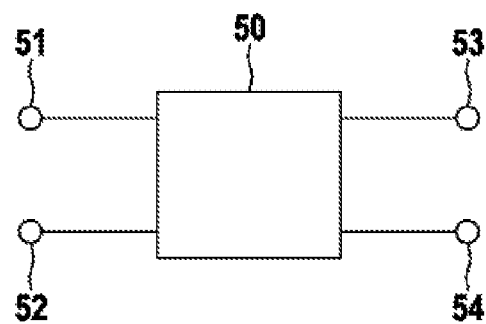
FIG. 6 shows a second embodiment of a coupling unit for use in the battery in accordance with the disclosure.

FIG. 6 illustrates a second embodiment of a coupling unit 50 for use in the battery system in accordance with the disclosure. The coupling unit 50 comprises two inputs 51 and 52 and also two outputs 53 and 54. Said coupling unit is embodied to connect either the first input 51 to the first output 53 and also to connect the second input 52 to the second output 54 (and to disconnect the first output 53 from the second output 54) or else to connect the first output 53 to the second output 54 (and in so doing to disconnect the inputs 51 and 52). In the case of particular embodiments of the coupling unit 50, said coupling unit can also be embodied to disconnect the two inputs 51, 52 from the outputs 53, 54 and also to disconnect the first output 53 from the second output 54. However, it is not provided that it can also connect the first input 51 to the second input 52.

Figure 7:
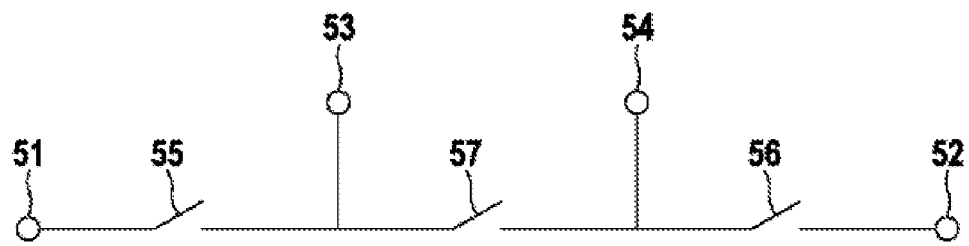
FIG. 7 shows a possible implementation of the second embodiment of the coupling unit with regard to the switching technology.

FIG. 7 illustrates a possible implementation of the second embodiment of the coupling unit 50 with regard to the switching technology, wherein a first, a second and a third switch 55, 56 and 57 are provided. The first switch 55 is connected between the first input 51 and the first output 53; the second switch 56 is connected between the second input 52 and the second output 54 and the third switch 57 is connected between the first output 53 and the second output 54. This embodiment likewise provides the advantage that the switches 55, 56 and 57 can be embodied simply as semi-conductor switches such as MOSFETs or IGBTs. Semi-conductor switches have the advantage of being favorably priced and providing a high switching rate, so that the coupling unit 50 can react within a comparatively short time period to a control signal and accordingly to a change of control signal.

Figure 8:
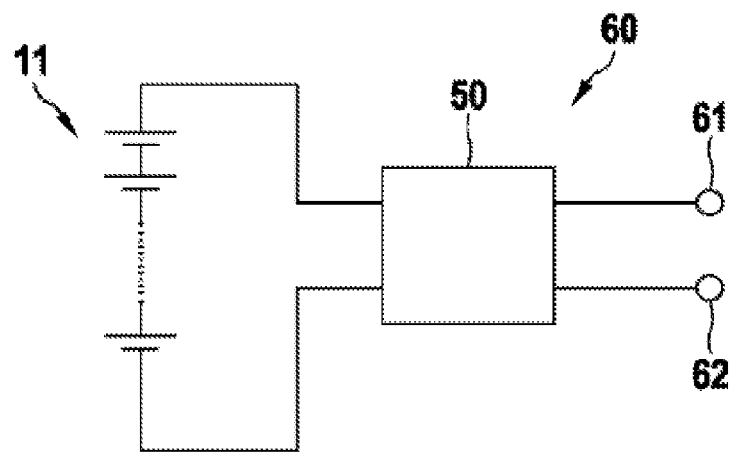
FIG. 8 shows an embodiment of a battery module having the second embodiment of the coupling unit.

FIG. 8 illustrates an embodiment of a battery module 60 having the second embodiment of the coupling unit 50. A plurality of battery cells 11 is connected in series between the inputs of a coupling unit 50. Also this embodiment of the battery module 60 is not limited to battery cells 11 being connected in series in this manner, it can in turn also provide only an individual battery cell 11 or else a parallel connection or a combination of a series and parallel connection of battery cells 11. The first output of the coupling unit 50 is connected to a first terminal 61 and the second output of the coupling unit 40 is connected to a second terminal 62. In comparison to the battery module 40 of FIGS. 5A and 5B, the battery module 60 provides the advantage that the battery cells 11 can be disconnected on both sides from the remaining battery by means of the coupling unit 50, which renders it possible to replace said battery without risk during operation, since the dangerously high total voltage of the remaining battery modules of the battery is not available at any pole of the battery cells 11.

Figure 1:
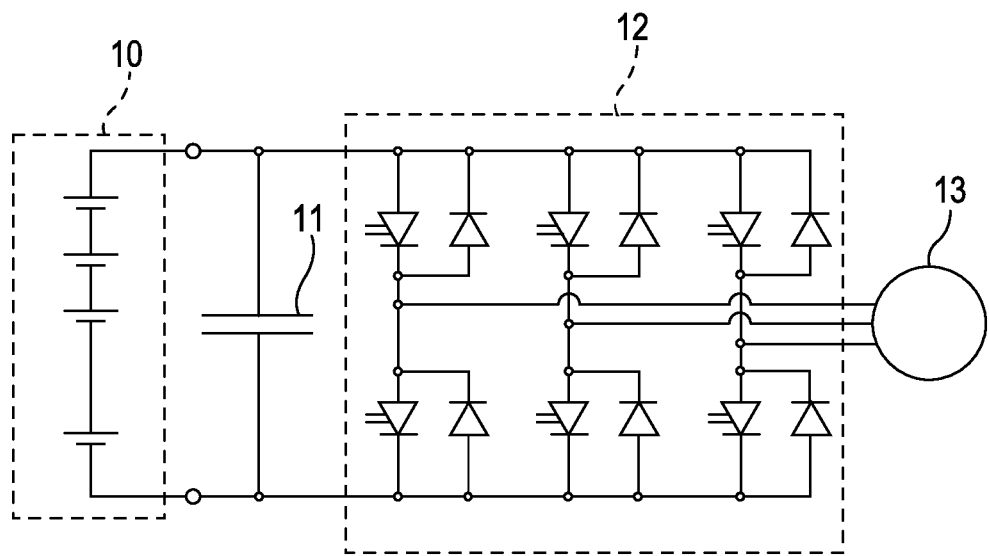
FIG. 1 shows an electric drive system in accordance with the prior art.
Figure 2:
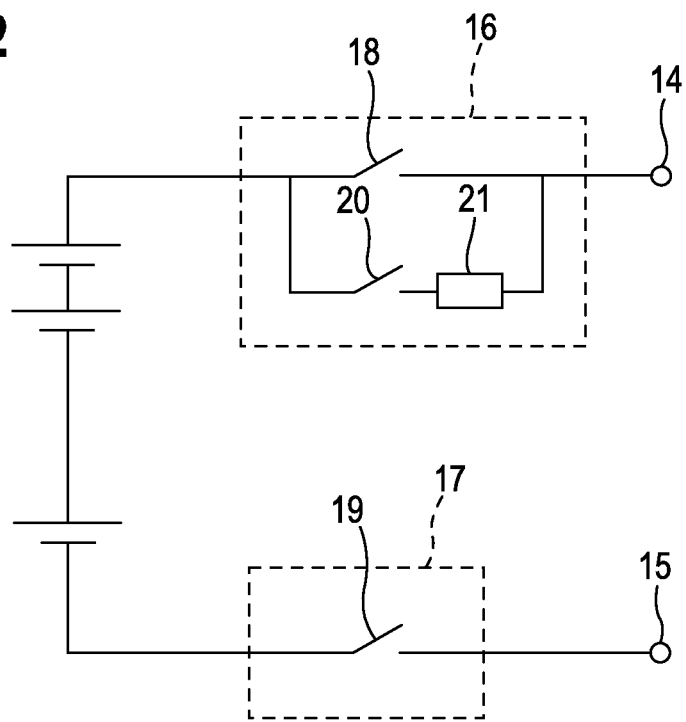
FIG. 2 shows a block diagram of a battery in accordance with the prior art.
Figure 9:
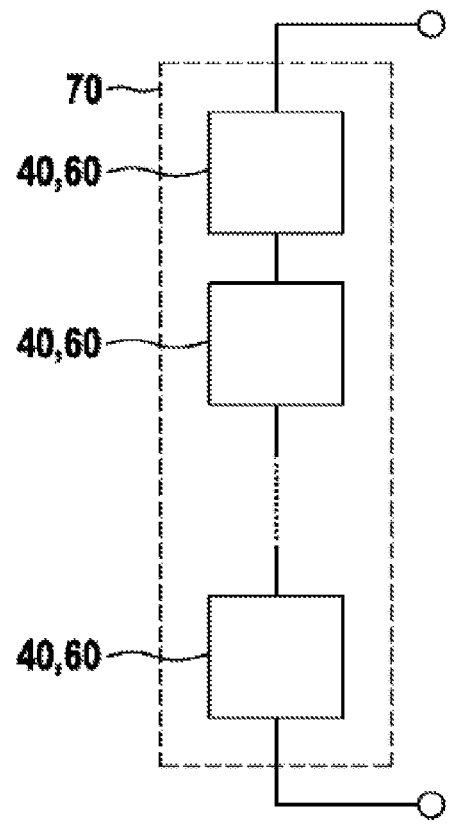
FIG. 9 shows a battery for use in the battery system in accordance with the disclosure.

FIG. 9 illustrates an embodiment of the battery of the battery system in accordance with the disclosure. The battery comprises a battery module string 70 having a plurality of battery modules 40 or 60, wherein preferably each battery module 40 or 60 comprises the same number of battery cells 11 that are connected in an identical manner. Generally, the number of battery modules 40 or 60 in the battery module string 70 can be greater than 1. It is also possible to provide on the poles of the battery module string 70 in addition charging and disconnecting devices and disconnecting devices such as illustrated in FIG. 2, if safety regulations require this. However, disconnecting devices of this type are not necessary in accordance with the disclosure because the battery cells 11 can be disconnected from the battery connections by means of the coupling units 30 or 50 that are provided in the battery modules 40 or 60.

In addition to the already mentioned advantages, the disclosure has the further advantage that it can be constructed in an extremely simple modular manner from individual battery modules having an integrated coupling unit. As a consequence, it is possible to use identical parts (modular design principle).

The invention claimed is:

1. A battery system comprising:
   a battery;
   a DC voltage intermediate circuit connected to the battery;
   an AC converter connected to the DC voltage intermediate circuit; and
   an electric motor connected to the AC converter,
   wherein the DC voltage intermediate circuit includes a capacitor,
   wherein the battery includes a battery module string having a plurality of battery modules that are connected in series, and a control unit,
   wherein each battery module of the plurality of battery modules includes a coupling unit and at least one battery cell connected between a first input and a second input of the coupling unit,
   wherein the coupling unit is configured (i) to switch the at least one battery cell between a first terminal of a respective battery module of the plurality of battery modules and a second terminal of the respective battery module in response to a first control signal, and (ii) in response to a second control signal, to connect the first terminal to the second terminal, and
   wherein the control unit is configured to transmit the first control signal to a variable number of battery modules of the battery module string and to transmit the second control signal to a remaining number of battery modules of the battery module string and thus to set a voltage of the DC voltage intermediate circuit in a variable manner.

2. The battery system as claimed in claim 1, wherein the battery is connected directly to the DC voltage intermediate circuit.

3. The battery system as claimed in claim 1, wherein at least one of the coupling units of the battery module string is configured to disconnect the first terminal of the respective battery module from the second terminal in response to a third control signal from each other and from the at least one battery cell.

4. The battery system as claimed in claim 1, wherein:
the coupling unit includes a first output, and
the coupling unit is configured to connect either the first input or the second input to the first output in response to the first control signal.

5. The battery system as claimed in claim 1, wherein:
the coupling unit includes a first output and a second output, and
the coupling unit is configured (i) to connect the first input to the first output and the second input to the second output in response to the first control signal, and (ii) in response to the second control signal, to disconnect the first input from the first output and the second input from the second output and to connect the first output to the second output.

6. The battery system as claimed in claim 1, wherein:
the control unit includes a battery cell diagnostic unit connected to the at least one battery cell of the plurality of battery modules,
the control unit is configured to determine a state of aging of the at least one battery cell, and
the control unit is further configured to transmit the second control signal to the battery modules of the plurality of battery modules for whose at least one battery cell the battery cell diagnostic unit has determined the state of aging to be greater than a predetermined maximum state of aging.

7. The battery system as claimed in claim 1, wherein the at least one battery cell is a lithium-ion battery cell.

8. A motor vehicle comprising:
a battery system including (i) a battery, (ii) a DC voltage intermediate circuit connected to the battery, (iii) an AC converter connected to the DC voltage intermediate circuit, and (iv) an electric motor connected to the AC converter,
wherein the electric motor is configured to drive the motor vehicle,
wherein the DC voltage intermediate circuit includes a capacitor,
wherein the battery includes a battery module string having a plurality of battery modules that are connected in series, and a control unit,
wherein each battery module of the plurality of battery modules includes a coupling unit and at least one battery cell connected between a first input and a second input of the coupling unit,
wherein the coupling unit is configured (i) to switch the at least one battery cell between a first terminal of a respective battery module of the plurality of battery modules and a second terminal of the respective battery module in response to a first control signal, and (ii) in response to a second control signal, to connect the first terminal to the second terminal, and
wherein the control unit is configured to transmit the first control signal to a variable number of battery modules of the battery module string and to transmit the second control signal to a remaining number of battery modules of the battery module string and thus to set a voltage of the DC voltage intermediate circuit in a variable manner.

9. A method for operating a battery system having a battery, a DC voltage intermediate circuit connected to the battery, an AC converter connected to the DC voltage intermediate circuit, and an electric motor connected to the AC converter, wherein the battery includes a plurality of battery cells, the method comprising:
determining a state of aging of the plurality of battery cells;
comparing the state of aging of the plurality of battery cells with a predetermined maximum state of aging;
disconnecting a number of battery cells of the plurality of battery cells, wherein the number of battery cells includes precisely those battery cells of the plurality of battery cells whose state of aging is greater than the maximum state of aging;
bridging the number of battery cells;
connecting in series a remaining number of battery cells of the plurality of battery cells; and
setting a voltage of the DC voltage intermediate circuit in a variable manner.

* * * * *